March 20, 1945.  H. W. START ET AL  2,371,931

STRAIGHT-BAR KNITTING MACHINE

Filed April 6, 1944

INVENTORS
Harry W. Start, and
Ernest Start.

BY Mason, Porter & Diller
ATTORNEYS

Patented Mar. 20, 1945

2,371,931

UNITED STATES PATENT OFFICE 2,371,931

STRAIGHT-BAR KNITTING MACHINE

Harry Wilfred Start, Carlton, and Ernest Start, Wilford, England

Application April 6, 1944, Serial No. 529,797
In Great Britain February 25, 1943

4 Claims. (Cl. 66—82)

This invention relates to improvements in straight-bar knitting machines and refers to improvements in chain or like driving mechanism used in such machines for driving the reciprocating parts and is applicable to either endless continuously running chains or to reciprocating chain bands or the like. Apparatus of this character is disclosed in U. S. Letters Patent 2,370,501 issued to Harry Wilfred Start and Ernest Start on February 27, 1945.

In chain driving mechanism of the kind referred to the chain is disposed round a series of sprockets. The chain carries a driver which is either adapted to engage in a fork attached to a slide which is in turn attached to the reciprocating parts or is connected to the slide by a link and the sprockets are arranged so that the driver is adapted to reciprocate the slide and consequently the parts attached thereto as it moves with the chain. The movement of the slide from rest up to its maximum speed and from its maximum speed to rest is obtained as the driver passes through an angle of ninety degrees round certain of the sprockets of the series which carry the chain. Normally two parallel chains are used and the driver is disposed between the two chains and is attached thereto by a pin or pins which may be extended and the ends replace the normal chain rivets at this point.

With this arrangement it will be readily understood that the strain of moving the slide from rest up to its maximum speed and vice versa is taken wholly by the pin or pins which connect the driver to the chains and as these are of necessity small in diameter they frequently break under the strain.

The object of the present invention is to relieve the pin or pins which extend across between the chains and carry the driver of any strain during the movement of the slide from rest up to its maximum speed and vice versa.

According to this invention the sprockets round which the driver passes during the movement of the slide from rest up to its maximum speed and vice versa are each provided with an associated member adapted to engage with the driver and take the strain on the latter during the movement of the slide from rest up to its maximum speed and vice versa.

Figure 1:
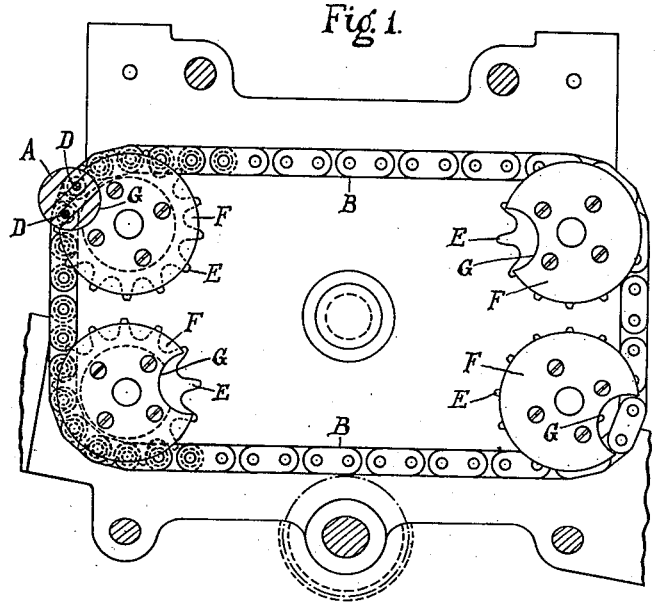

The invention will now be more particularly described with reference to the accompanying drawing in which:

Fig. 1 is a sectional front elevation and

Figure 2:
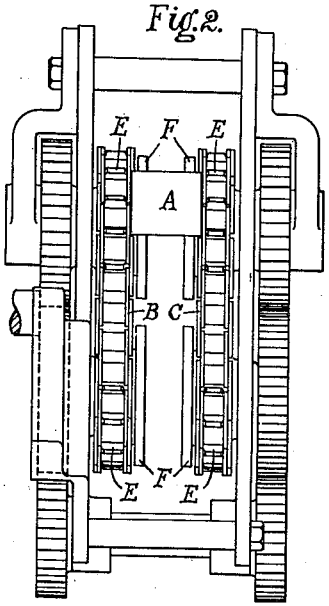
Figure 3:
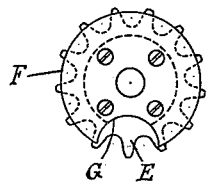
Figure 4:
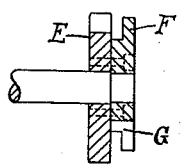
Figure 5:
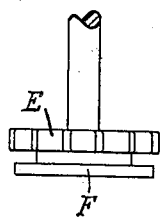

Fig. 2 an end elevation showing our invention applied to chain driving mechanism for the reciprocating parts of a straight-bar knitting machine of the kind having an endless chain, Fig. 3 is a front elevation, Fig. 4 a sectional side elevation and Fig. 5 a plan of one of the chain sprockets shown detached.

Like letters indicate like parts throughout the drawing.

In carrying out this invention the driver A is made cylindrical as shown in the drawing or provided with a cylindrical part at each end. The driver A is preferably disposed between two parallel chains B, C, with its axis at right angles thereto and is preferably attached thereto by two pins D which pass through the driver. The pins D extend across between the two chains B, C, and may comprise extensions of a pair of adjacent chain rivets but preferably the ends of the pins pass through the two chains and replace the normal rivets. When an endless chain is used the two pins may be used in well known manner to form a joint in the chain.

The sprockets E round which the chains pass are each provided with a member F secured thereto. Each member F comprises a disc which is secured to the sprocket co-axial therewith and is provided with a substantially semi-circular opening G in its periphery to engage with the driver A or the cylindrical end thereof as shown in Fig. 1. As two chains are used to carry the driver A a set of sprockets will be required for each chain so that the sprockets are mounted in pairs, and each sprocket is provided with a disc shaped member F disposed on the inner side of the sprocket. The openings G in the peripheries of the disc F are set so that they engage with the ends of the driver A as it passes round the sprockets and consequently both ends of the driver A will be engaged by the openings G in the disc shaped members.

It will therefore be seen that when the driver A passes round the sprockets to move the slide from rest up to its maximum speed and vice versa the driver will also be engaged by the openings G in the peripheries of the disc shaped members F associated with the sprockets and the strain on the driver A will be taken by the disc shaped members F and that part of the pins extending across between the chains will be relieved of any strain.

Figs. 1 and 2 of the drawing show the invention applied to an endless chain. It will be seen that the members F associated with the sprockets E must be set so that the openings G engage with the ends of the driver A as it passes round the sprockets. For this purpose the sprockets are made identical and the number of links in the chain must be a multiple of the number of teeth in the sprockets. As an example, if sprockets having thirteen teeth of one inch pitch are used, a suitable chain of one inch pitch would be one fifty-two inches long. This would permit of the spacing of the sprockets so as to provide a stroke to the reciprocating parts of approximately eighteen inches and a dwell of sufficient length of time between each reciprocating motion.

The arrangement described is applicable to either a continuously running chain or a reciprocating chain and where circumstances permit of the sprockets being driven the discs associated with the sprockets also drive the driver and relieve the chain of any strain during the passage of the driver round the sprockets.

What we claim as our invention is:

1. In chain driving mechanism for the reciprocating parts of straight-bar knitting machines the combination with the sprockets round which the driver passes to move the reciprocating parts from rest up to their maximum speed and vice versa of discs having openings formed therein to engage with the driver and take the strain thereon as it passes round the sprockets.

2. In chain driving mechanism for the reciprocating parts of straight-bar knitting machines the combination with the sprockets round which the driver passes to move the reciprocating parts from rest up to their maximum speed and vice versa of discs having substantially semi-circular openings therein to engage with the driver and take the strain thereon as it passes round the sprockets.

3. In chain driving mechanism for the reciprocating parts of straight-bar knitting machines the combination with the sprockets round which the driver passes to move the reciprocating parts from rest up to their maximum speed and vice versa of discs secured to the sprockets and formed with openings therein to engage with the driver as it passes round the sprockets.

4. In chain driving mechanism for the reciprocating parts of straight-bar knitting machines the combination with the sprockets round which the driver passes to move the reciprocating parts from rest up to their maximum speed and vice versa of discs secured to the sprockets and formed with substantially semi-circular openings therein to engage with the driver as it passes round the sprockets.

HARRY WILFRED START.
ERNEST START.